US008807476B2

(12) United States Patent
Raffel et al.

(10) Patent No.: US 8,807,476 B2
(45) Date of Patent: Aug. 19, 2014

(54) HELICOPTER WITH OBLIQUE TAIL BOOM

(71) Applicant: Deutsches Zentrum für Luft- und Raumfahrt e.V., Cologne (DE)

(72) Inventors: Markus Raffel, Goettingen (DE); Kai Richter, Goettingen (DE); Anthony Gardner, Goettingen (DE)

(73) Assignee: Deutsches Zentrum fur Luft-und Raumfahrt E.V., Cologne (DE)

( * ) Notice: Subject to any disclaimer, the term of this patent is extended or adjusted under 35 U.S.C. 154(b) by 323 days.

(21) Appl. No.: 13/735,135

(22) Filed: Jan. 7, 2013

(65) Prior Publication Data
US 2013/0175386 A1    Jul. 11, 2013

(30) Foreign Application Priority Data

Jan. 6, 2012 (DE) .......................... 10 2012 100 102

(51) Int. Cl.
*B64C 27/82* (2006.01)
*B64C 27/04* (2006.01)
*B64C 5/10* (2006.01)

(52) U.S. Cl.
CPC .. *B64C 27/04* (2013.01); *B64C 5/10* (2013.01)
USPC .................................... 244/17.19; 244/17.11

(58) Field of Classification Search
USPC ................................. 244/17.19, 17.21, 17.11
See application file for complete search history.

(56) References Cited

U.S. PATENT DOCUMENTS

| 2,580,312 | A | | 12/1951 | Moore |
| 3,464,651 | A | | 9/1969 | Lightfoot |
| 3,750,982 | A | * | 8/1973 | Gear ........................... 244/17.11 |
| 3,921,938 | A | * | 11/1975 | Jupe et al. .................. 244/17.11 |
| 4,200,252 | A | * | 4/1980 | Logan et al. ................ 244/17.19 |
| 4,462,559 | A | * | 7/1984 | Garza ......................... 244/17.19 |
| 4,708,305 | A | * | 11/1987 | Kelley et al. ................ 244/17.19 |
| 4,948,068 | A | * | 8/1990 | VanHorn ..................... 244/17.19 |
| 5,497,960 | A | * | 3/1996 | Previnaire ................... 244/17.11 |
| 6,352,220 | B1 | * | 3/2002 | Banks et al. ................ 244/17.19 |
| 8,556,207 | B2 | * | 10/2013 | Cilli ............................ 244/17.19 |
| 2010/0123039 | A1 | | 5/2010 | Buhl et al. |
| 2010/0127114 | A1 | * | 5/2010 | Nakayama et al. ........ 244/17.21 |
| 2011/0024551 | A1 | | 2/2011 | Biest et al. |

(Continued)

FOREIGN PATENT DOCUMENTS

DE    1 118 017 A    11/1961
DE    1 144 116 A     2/1963

(Continued)

*Primary Examiner* — Tien Dinh
*Assistant Examiner* — Michael A Fabula
(74) *Attorney, Agent, or Firm* — Thomas | Horstemeyer, LLP

(57) ABSTRACT

A helicopter (1) has a horizontal rotor (2) driven for rotation about a vertical rotor axis (4), and a tail (9) extending backwards from the rotor axis (4) at a fixed angle (10) between about 20° and about 60° to a vertical longitudinal middle plane (7) of the helicopter (1) on a retreating blade side of the horizontal rotor (2). The tail (9) comprises a profiled body (16) including aerodynamic effective surfaces (19, 20) for selectively generating lift on the retreating blade side of the horizontal rotor (2) in forward flight of the helicopter (1). For hovering flight of the helicopter (1), the profiled body (16) can be swiveled about a swivel axis running parallelly to the main axis (21) of the tail for reducing a cross-sectional area of the profiled body facing the horizontal rotor (2).

10 Claims, 3 Drawing Sheets

(56) References Cited

U.S. PATENT DOCUMENTS

| | | |
|---|---|---|
| 2011/0036954 A1 | 2/2011 | Piasecki |
| 2011/0133022 A1* | 6/2011 | Cilli .......................... 244/17.13 |
| 2012/0012693 A1* | 1/2012 | Thomassey ................ 244/17.21 |
| 2014/0008486 A1* | 1/2014 | Alber et al. ................ 244/17.21 |

FOREIGN PATENT DOCUMENTS

| | | | |
|---|---|---|---|
| DE | 1 581 060 B | 9/1969 | |
| DE | 1 756 222 C | 8/1972 | |
| DE | 2 236 415 A | 3/1973 | |
| DE | 41 19 388 A1 | 12/1992 | |
| DE | 10 2008 057 715 A1 | 5/2010 | |
| FR | 1 467 573 A | 12/1966 | |
| GB | 1 394 177 | 5/1975 | |
| GB | 2 146 603 | 4/1985 | |
| JP | 05229490 A | 7/1993 | |
| JP | 05254492 A * | 10/1993 | ............. B64C 27/06 |
| JP | 07132893 A | 5/1995 | |
| JP | 10181694 A | 7/1998 | |

* cited by examiner

HELICOPTER WITH OBLIQUE TAIL BOOM

CROSS REFERENCE TO RELATED APPLICATIONS

This application claims priority to co-pending German Patent Application No. DE 10 2012 100 102.2 entitled "Hubschrauberkonfiguration", filed Jan. 6, 2012.

FIELD OF THE INVENTION

The present invention relates to a helicopter comprising a horizontal rotor driven for rotation about a vertical rotor axis and a boom extending away from the rotor axis.

BACKGROUND OF THE INVENTION

On helicopters, two aspects have to be particularly cared for. On the one hand, a counter torque has to be provided to the torque of the horizontal rotor driven for rotation about the vertical rotor axis. Without such a counter torque the fuselage of the helicopter would rotate about the vertical rotor axis in opposite direction to the horizontal rotor.

On the other hand, in forward flight of a helicopter, due to the rotational movement of the horizontal rotor, the flow against the rotor blades on the advancing blade side of the horizontal rotor strongly differs from the flow against the rotor blades on the retreating blade side of the horizontal rotor. On the advancing blade side, the rotor blades move faster in forward direction than the fuselage of the helicopter and are thus subject to a correspondingly higher relative flow velocity of the air surrounding of the helicopter. As a result, the rotor blades on the advancing blade side of the horizontal rotor provide a comparatively high lift even at small pitch angles.

On the retreating blade side of the horizontal rotor, however, the rotor blades, relative to the fuselage of the helicopter, move opposite to the direction in which the entire helicopter flies forward. With same pitch angles, this results into a considerably lower speed of the flow against the rotor blades with correspondingly lower lift on the retreating blade side. In the inner area of the horizontal rotor, where the circumferential velocities of the rotor blades are lower, even reverse flow may occur at the rotor blades, which result in a negative or downward lift.

It is a known method to provide a further horizontal rotor driven in opposite direction for providing the counter torque to the torque of the horizontal rotor. A more common measure for providing the counter torque to the torque of the horizontal rotor, however, is a vertical tail rotor driven for rotation about a horizontal axis at a tail of the helicopter. In known helicopters, this tail rotor is driven at a fixed gear ratio together with the horizontal rotor. Different torques of the horizontal rotor of the helicopter are then compensated for by different pitch angles of the rotor blades of the tail rotor. A tail rotor may also be shrouded and is then designated as a fenestron. The shroud of the tail rotor has the result that its rotor blades are not subject to an undesired radial flow at higher forward velocities of the helicopter. Further, the shroud of the tail rotor reduces the danger of colliding with its rotating rotor blades which are hardly visible to people approaching the landed helicopter.

In forward flight of a helicopter, the tail rotor may be assisted by a fin at the end of the tail, and the tail rotor may even become needless due to this fin. Such a fin at the end of the tail also keeps a helicopter stabilized in its flight direction when its drive fails and when its horizontal rotor is excited for autorotation by the flow due to the sinking speed of the helicopter.

The different flow velocities of the flow against the rotor blades on the advancing blade and the retreating blade side of the horizontal rotor of a helicopter are generally coped with in that the pitch angle of the rotor blades is varied over each rotation about the vertical rotor axis of the horizontal rotor periodically between a low pitch angle on the advancing blade side and a high pitch angle on the retreating blade side of the horizontal rotor. Nevertheless, the different flow velocities on the advancing blade and the retreating blade side of the horizontal rotor mark a limit for the velocity reachable with a helicopter in forward flight as the maximum pitch angle on the retreating blade side is limited by the danger of a flow separation with a simultaneous breakdown of the lift.

The Eurocopter $X^3$ is known as a helicopter for higher forward velocities. This helicopter is a hybrid gyrocopter which has two short wings laterally attached to its fuselage below its horizontal rotor, each wing being provided with a large propeller directed in forward direction. In addition to increasing the forward drive of the helicopter, these propellers also provide the counter torque to the torque of the horizontal rotor. The Eurocopter $X^3$ comprises a passive tail with a double fin. With higher forward velocities, the rotational speed of the horizontal rotor is lowered to avoid transonic flow velocities of the rotor blades. Then, the required lift is essentially provided by the short wings.

The known helicopter Lockheed AH-56 comprises short wings laterally attached to its fuselage below the horizontal rotor and, in addition to the usual tail rotor, an additional thrust propeller at its tail for reaching higher flight velocities.

The known helicopter Sikorsky Piasecki X-49 comprises short wings laterally attached to its fuselage below the horizontal rotor, and a shrouded thrust propeller at its tail. The airflow created by this thrust propeller is laterally deflectable with flaps to provide the counter torque to the torque of the horizontal rotor.

With all helicopters comprising short wings below the horizontal rotor, there are strong mechanical loads to the short wings during hovering flight of the respective helicopter. In hovering, the horizontal rotor propels air from the surroundings downwardly to generate lift. The resulting downward airflow hits the short wings from above. Further, this airflow is not homogeneous, but it comprises vortices and even shockwaves which cause considerable accelerations of the short wings in different directions.

JP 10181694 A discloses helicopter comprising a horizontal rotor, a tail with a stab, a fin and a tail rotor, and a further boom on the retreating blade side of the horizontal rotor for selectively generating lift here in forward flight of the helicopter. The lateral boom can be swiveled about a vertical swivel axis from beneath the fuselage of the helicopter in forward direction until it extends perpendicular to the vertical longitudinal middle plane of the helicopter. Additionally, the pitch angle of the boom may be varied in that the boom is swiveled about its main axis extending away from the rotor axis of the horizontal rotor. This second swivellability is used to vary the lift generated by the boom.

JP 7132893 A discloses a helicopter which, besides a horizontal rotor and a tail with a tail rotor, comprises booms on both the advancing blade and the retreating blade sides of the horizontal rotor in a symmetric arrangement with regard to the vertical longitudinal middle plane of the helicopter. The booms are selectively swiveled about a swivel axis running parallelly to the longitudinal middle plane of the helicopter, to generate a higher lift on the retreating blade side than on the advancing blade side of the horizontal rotor during forward flight of the helicopter. Further, the booms can be swiveled in such a way that their leading edges point upwards and their trailing edges point downwards to minimize their cross-section facing the horizontal rotor during hovering flight of the helicopter. Such a helicopter configuration is also known from DE 1 756 222 C, corresponding to U.S. Pat. No. 3,464, 651, JP 5229490 A and DE 2 236 415 A, corresponding to GB 1 394 177.

FR 1 467 573 A discloses a helicopter comprising a horizontal rotor and a tail with a tail rotor. Additionally, a single stab is provided at the tail on the retreating blade side of the horizontal rotor. Further, this known helicopter comprises a telescopically extendable boom on the retreating blade side of the horizontal rotor for selectively generating lift on this side of its vertical longitudinal middle plane.

U.S. Pat. No. 2,580,312 A discloses a helicopter which, besides a horizontal rotor and a tail with a fin and a stab, comprises wings which may be folded in and a backward oriented propeller.

DE 1 581 060 B discloses a helicopter with a tail rotor which can be swiveled about a vertical swivel axis.

DE 1 144 116 A discloses a helicopter with a tail comprising a tail rotor. A variable pitch angle of the rotor blades of the tail rotor is controlled together with a fin also provided at the tail.

DE 41 19 388 A1 discloses a helicopter with a side rotor. The side rotor is a vertical rotor which is provided on the advancing blade side of the horizontal rotor of the helicopter, and which is mounted to the tail of the helicopter via a boom extending perpendicular to the vertical longitudinal middle plane of the helicopter.

DE 1 118 017 A discloses a helicopter with a tail rotor which is shrouded and whose airflow can be deflected by means of flaps which may be swiveled about vertical axes.

US 2011/0036954 A1 discloses a helicopter comprising a horizontal rotor, wings arranged below the horizontal rotor and a backward oriented propeller at a tail. This propeller is shrouded, and the airflow generated by the propeller which is generally directed backwards can be laterally deflected by means of a flap.

US 2011/0024551 A1 discloses a helicopter comprising a horizontal rotor, wings extending perpendicular to the vertical longitudinal middle plane of the helicopter, at which vertical rotors are arranged, and a short tail provided with a fin and a stab.

There still is the need for a helicopter which, despite a particularly simple configuration, allows for reaching high flight velocities.

SUMMARY OF THE INVENTION

The present invention relates to a helicopter comprising a vertical longitudinal middle plane, a horizontal rotor including rotor blades, a rotor drive driving the horizontal rotor for rotation about a vertical rotor axis, and a tail extending backwards from the vertical rotor axis. The horizontal rotor has a advancing blade side on which its rotor blades run in forward direction and a retreating blade side on which its rotor blades run in backward direction in forward flight of the helicopter. The advancing blade side and the retreating blade side of the horizontal rotor meet at the vertical longitudinal middle plane of the helicopter. The boom extends backwards at a fixed angle selected from a range from about 20° to about 60° to the vertical longitudinal middle plane of the helicopter on the retreating blade side of the horizontal rotor. The boom comprises a profiled body, the profiled body including a leading edge, a trailing edge and aerodynamic effective surfaces extending between the leading edge and the trailing edge. The profiled body is configured to selectively generate lift on the retreating blade side of the horizontal rotor in forward flight of the helicopter; and the profiled body is mounted such that at least a part of the profiled body can be swiveled about a swivel axis running parallelly to the main axis of the tail for reducing a cross-sectional area of the profiled body facing the horizontal rotor during hovering flight of the helicopter as compared to forward flight of the helicopter.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
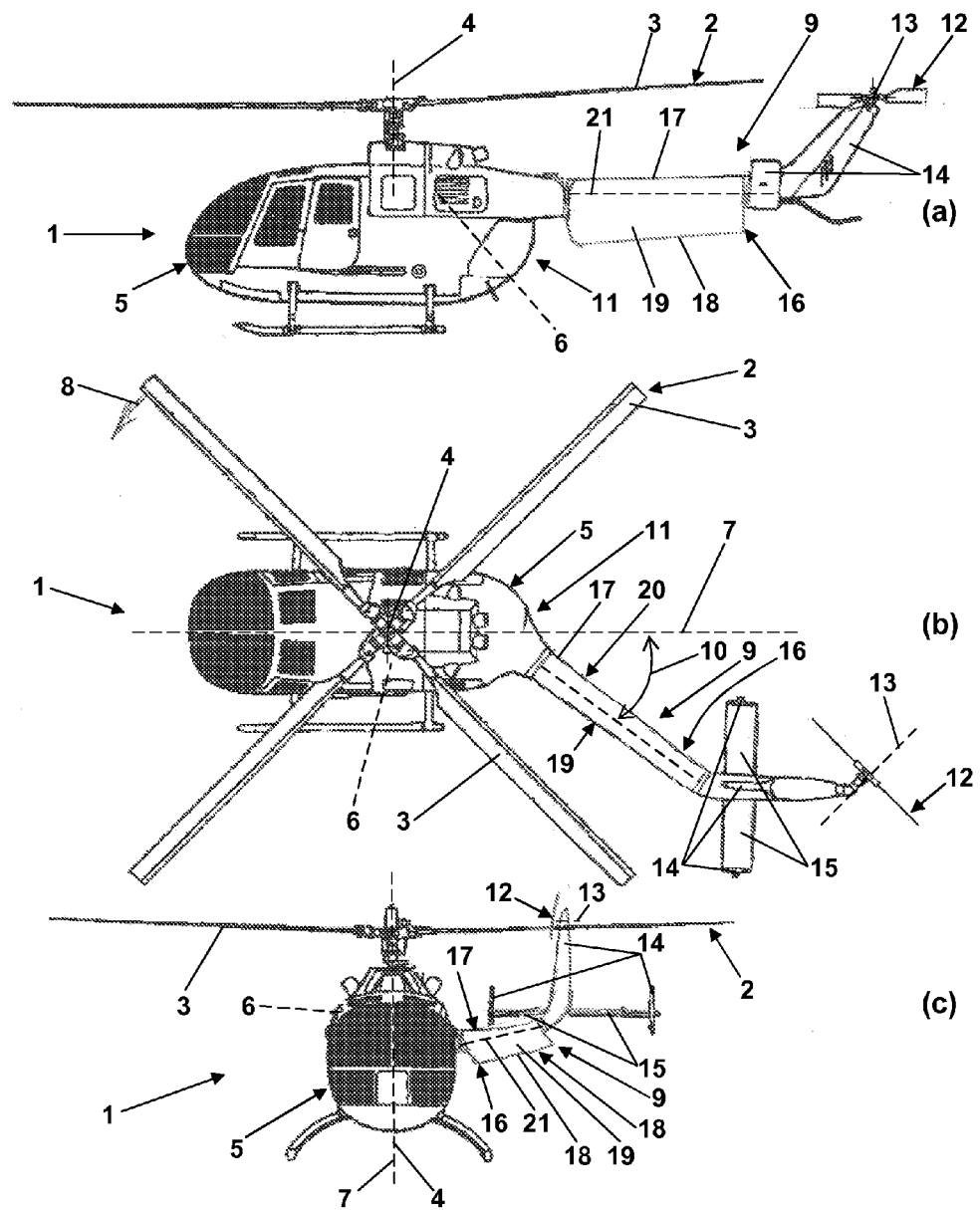
FIG. 1 shows a first embodiment of the helicopter according to the present invention in a side view (a), a top view (b), and a front view (c) during hovering flight.

The term "vertical longitudinal middle plane" as used here refers a virtual vertical plane longitudinally dividing the fuselage of the helicopter in halves of similar shape.

The terms "horizontal rotor" and "vertical rotor" as used here, do not necessarily mean that the respective rotor exactly extends or runs in a horizontal or vertical plane, or that the respective rotor axis is exactly oriented vertically or horizontally. In a helicopter, for example, it is usual to provide at least a part of its forward drive by tilting the rotor axis of its horizontal rotor in forward direction.

The tail of a helicopter according to the present invention is asymmetric, i.e. particularly not mirror symmetric with regard to the vertical longitudinal middle plane of the helicopter. It may be that a helicopter according to the present invention has an additional boom at the advancing blade side of the horizontal rotor in a similar position as the tail on the retreating blade side of the horizontal rotor. This additional boom, however, will then be essentially smaller than the main boom of the helicopter of the present invention. Preferably, there is no further boom on the advancing blade side of the horizontal rotor in a helicopter according to the present invention. The boom shifted to the retreating blade side of the horizontal rotor selectively provides lift by means of the aerodynamic effective surfaces of its profiled body on the retreating blade side of the horizontal rotor in forward flight of the helicopter. In this way, the horizontal rotor is relieved from the task of generating all the lift on its retreating blade side. On the advancing blade side of the horizontal rotor, however, the lift is essentially and normally completely generated by the horizontal rotor of the helicopter of the present invention.

To mechanically unload the boom including the profiled body during hovering flight of the helicopter of the present invention, at least a part of the profiled body, out of its lift generating position during forward flight, is swiveled about a swivel axis running parallely to the main axis of the boom such that its cross-sectional area facing the horizontal rotor is essentially reduced. As compared to the forward flight, this reduction of the cross-sectional area of the profiled body will typically be at least 50%, preferably at least 75%. Correspondingly, shockwaves and vortices in the downward directed airflow generated by the horizontal rotor during hovering flight may only attack the profiled body via a considerably reduced surface area. This is a particular advantage with large aerodynamic effective surfaces of the profiled body provided for lift generation in forward flight of the helicopter.

In the helicopter of the present invention, the boom extends backwardly at the fixed angle between about 20° or about 30° and about 60°, i.e. of roughly 40° to 45° to the vertical longitudinal middle plane of the helicopter. Even at such an angle, the boom, despite its asymmetric arrangement, may still fulfill the tasks of a usual tail of a helicopter, including direction stabilization of the helicopter by means of a fin at the free end of the boom when a rotor drive of the helicopter breaks down and the horizontal rotor generates lift by means of autorotation. Under such conditions, the helicopter of the present invention may be stabilized in the direction of the main axis of the boom running from the vertical rotor axis of the horizontal rotor to the fin at the free end of the boom. This, however, is no problem. Further, it may be suitable to start a forward flight of a helicopter according to the present invention in a direction parallel to the main axis of its boom, and to align the forward direction of the helicopter to its vertical longitudinal middle plane only after taking up some forward speed.

Preferably, the profiled body of the boom of the helicopter according to the present invention can be swiveled to such an extent that its back or trailing edge, in a vertical projection, is crossed by the rotor blades of the horizontal rotor earlier than its front or leading edge. Here, the terms "leading edge" and "trailing edge" refer to the orientation of the profiled body in forward flight of the helicopter. Swiveling the profiled body to such a high extent allows for providing counter torque to the torque of the horizontal rotor by means of the profiled body of the boom, like for example during hovering flight, in that the profiled body, with one of its aerodynamic effective surfaces, laterally deviates the vertical airflow generated by the horizontal rotor in a suitable way.

The profiled body has to be actively swiveled by means of some swivel drive so that the profiled body may reach and be held in such a swivel position. Generally, however, the profiled body of the boom of the helicopter according to the present invention may also be swiveled passively; i.e. the profiled body may be without any active swivel drive. For example, the profiled body may be passively swiveled by the flow flowing against its aerodynamically active surfaces in forward flight of the helicopter until the profiled body abuts against a stop which supports the lift generated by the flow against the profiled body. Without the flow which generates the lift in forward flight of the helicopter and which orients the aerodynamic effective surfaces of the profiled body about horizontally, the trailing edge of the profiled body may drop until it is arranged below the leading edge of the profiled body during hovering flight. This dropping of the trailing edge of the profiled body may be supported by bias spring. Further, a damper may be provided for this passive swivel motion of the profiled body.

It is not absolutely essential that the helicopter of the present invention has a vertical rotor at its boom. This even applies if the boom is the only boom of the helicopter extending away from the vertical axis of its horizontal rotor. If the boom has no vertical rotor and if the boom is the only boom of the helicopter, the profiled body, however, there has to be a swivel drive for actively swiveling the profiled body so that it may be brought in a swivel position in which it generates the necessary counter torque to the torque of the horizontal rotor during hovering flight of the helicopter.

When the helicopter of the present invention has an additional boom equipped with a vertical rotor, there is no need to provide a further vertical rotor at its tail.

When the boom of the helicopter of the present invention is provided with a vertical rotor, this vertical rotor is preferably arranged at the free end of the boom and with a rotor axis oriented tangentially to a circumference around the vertical rotor axis of the horizontal rotor. This arrangement helps to effectively generate the counter torque to the torque of the horizontal rotor. The rotor axis of the vertical rotor, however, does not need to be exactly tangential to the circumference around the vertical rotor axis of the horizontal rotor. It may, for example, be shifted towards an orientation in parallel to the longitudinal middle plane of the helicopter so that the vertical rotor is better suited for generating forward thrust during forward flight of the helicopter. The rotor axis of the vertical rotor may also be swivel mounted so that it can be swiveled to adapt its orientation to the actual flight situation.

Due to the arrangement of the boom outside the longitudinal middle plane of the helicopter according to the present invention, even a vertical rotor at the boom, whose horizontal rotor axis runs tangentially the circumference around the vertical axis of the horizontal rotor may be used for generating forward thrust for the helicopter. For this purpose, the vertical rotor may be configured to enable a reversal of its thrust direction along its horizontal rotor axis. A particularly suitable measure to achieve this reversal is an adjustability of the pitch angle of the rotor blades of the vertical rotor going beyond the neutral position, i.e. extending into the range of negative pitch angles.

In the helicopter according to the present invention, the vertical rotor at the boom may be shrouded. A shroud of the vertical rotor reduces the danger that people laterally approaching the helicopter overlook the rotating vertical rotor which may be more in their way than a tail rotor in the vertical longitudinal middle plane of a common helicopter.

A vertical rotor at the boom of the helicopter according to the present invention, whose rotor blades can be adjusted to different pitch angles, may be used to generate a suitable counter torque to the torque of the horizontal rotor in forward flight of the helicopter. With the boom arranged at an angle to the vertical longitudinal middle plane of the helicopter, an adjustable counter torque to the torque of the horizontal rotor may also be provided by means of an adjustable fin at the free end of the boom. Thus, it will be suitable to provide the helicopter according to the present invention not only with a passive fin but with an adjustable fin. Then, the torque generated by the flow against the fin in forward flight may be varied by adjusting the pitch angle of the fin to use this torque as the counter torque to the torque of the horizontal rotor. This is an option with all helicopters according to the present invention, particularly if they have no vertical rotor at their main boom or any other boom.

A further option to vary the counter torque to the torque of the horizontal rotor is a variation of the inclination angle of the profiled body of the boom. The flow resistance of the boom generates a torque about the vertical axis of the horizontal rotor in the right direction for a counter torque to the torque of the horizontal rotor, and this torque is varied with the inclination angle of the profiled body. Any variation of the inclination angle of the profiled body, however, also varies the lift generated by the profiled body in forward flight of the helicopter.

The profiled body of the boom of the helicopter of the present invention may be a rigid one piece construction, and it may provide essentially all aerodynamic effective surfaces of the boom over its extension along the boom. Particularly, the profiled body may enclose a supporting structure of the boom over its extension along the boom. Then, the profiled body is swivel mounted about the supporting structure. Even if parts of a supporting structure of the boom are provided outside the profiled body, the aerodynamic effective surfaces of the boom may be concentrated to its profiled body.

The boom of the helicopter of the present invention may not only comprise one but a plurality of profiled bodies with aerodynamic effective surfaces. These profiled bodies may be arranged one behind the other in the direction of the main axis of the boom. They may also be arranged one above the other in a biplane or multiplane configuration to make use of the generally known stability advantages of such biplane or multiplane arrangements.

The helicopter according to the present invention has the advantage that the boom arranged at an angle to the vertical longitudinal middle plane of the helicopter does not restrict access to the back of the fuselage of the helicopter. Correspondingly, the helicopter according to the present invention may have a comparatively large back door. The boom of the helicopter according to the present invention is attached to a part of the fuselage in which normally no door or other access opening is provided. Thus, it does not effect the accessibility to the fuselage of the helicopter.

Referring now in greater detail to the drawings, the helicopter 1 depicted in FIG. 1 comprises a horizontal rotor 2 with rotor blades 3, which is driven for rotation about a vertical rotor axis 4. For this purpose, a rotor drive 6 is provided within a fuselage 5 of the helicopter 1. The vertical rotor axis 4 runs in a vertical longitudinal middle plane 7, which is a virtual plane corresponding to the drawing plane of FIG. 1(a) and which intersects the drawing plane of FIG. 1(c) in the rotor axis 4. The rotor blades 3 of the horizontal rotor 2 which rotate about the rotor axis 4 in the direction of an arrow 8 depicted in FIG. 1(b) move forward on the upper side of the longitudinal middle plane 7 in FIG. 1(b) and on the left hand side of the longitudinal middle plane 7 in FIG. 1(c). On the respective other side of the horizontal rotor 2 with regard to the longitudinal middle plane 7 the rotor blades 3 move backward. This other side of the horizontal rotor 2 is thus designated as the retreating blade side of the horizontal rotor 2. A boom 9 of the helicopter 1 is asymmetrically arranged with regard to the longitudinal middle plane 7 on this retreating blade side of the horizontal rotor 2. Here, it runs at an angle 10 of slightly less than 45° to the longitudinal middle plane 7. In contrast to a tail extending in the longitudinal middle plane 7, the boom 9 allows for free access to a backdoor 11 of the helicopter 1 from the back. The angle to the longitudinal middle plane 7 is not the only difference between the boom 9 of the helicopter 1 and the tail of a common helicopter. Additionally, a vertical rotor 12 at the boom 9, which is driven together with the horizontal rotor 2 at a fixed gear ratio, is not arranged in or parallel to the longitudinal middle plane 7 but with its horizontal rotor axis 3 at an angle of about 45° to the longitudinal middle plane 7. In this way, the rotor axis 13 is essentially tangential to a circumference around the vertical rotor axis 4 of the horizontal rotor 2. In this way, the vertical rotor 12 is designed to generate a counter torque to the torque of the driven horizontal rotor to avoid an unwanted rotation of the fuselage 5. Further, a fin 14 and a stab 15 are provided at the free end of the boom 9. The fin 14 is aligned in parallel to the longitudinal middle plane 7. According to the present invention, the boom 9 further comprises a profiled body 16 with aerodynamic effective surfaces 19 and 20 extending between a leading edge 17 and a trailing edge 18. The profiled body 16 can be swiveled about the main axis 21 of the boom 9, to generate different aerodynamic forces with its aerodynamic surfaces 19 and 20.

In FIG. 1, the trailing edge 18 of the profiled body 9 on the retreating blade side of the horizontal rotor 2 is swept forward beyond the leading edge 17 so that, in the vertical projection according to FIG. 1(b), the trailing edge 18 is earlier crossed by the rotor blades 3 than the leading edge 17. As a result, the profiled body 16, particularly with its aerodynamic effective surface 19, deflects a downward directed airflow generated by the horizontal rotor 2 during hovering flight in forward direction and thus creates a counter torque to the torque of the horizontal rotor 2. During hovering flight of the helicopter 1 as depicted in FIG. 1, the trailing edge 18 may also be located directly below the leading edge 17 so that the profiled body 16 does not deflect the downward directed airflow generated by the horizontal rotor 2. Then, the counter torque will be generated with the vertical rotor 12.

Figure 2:
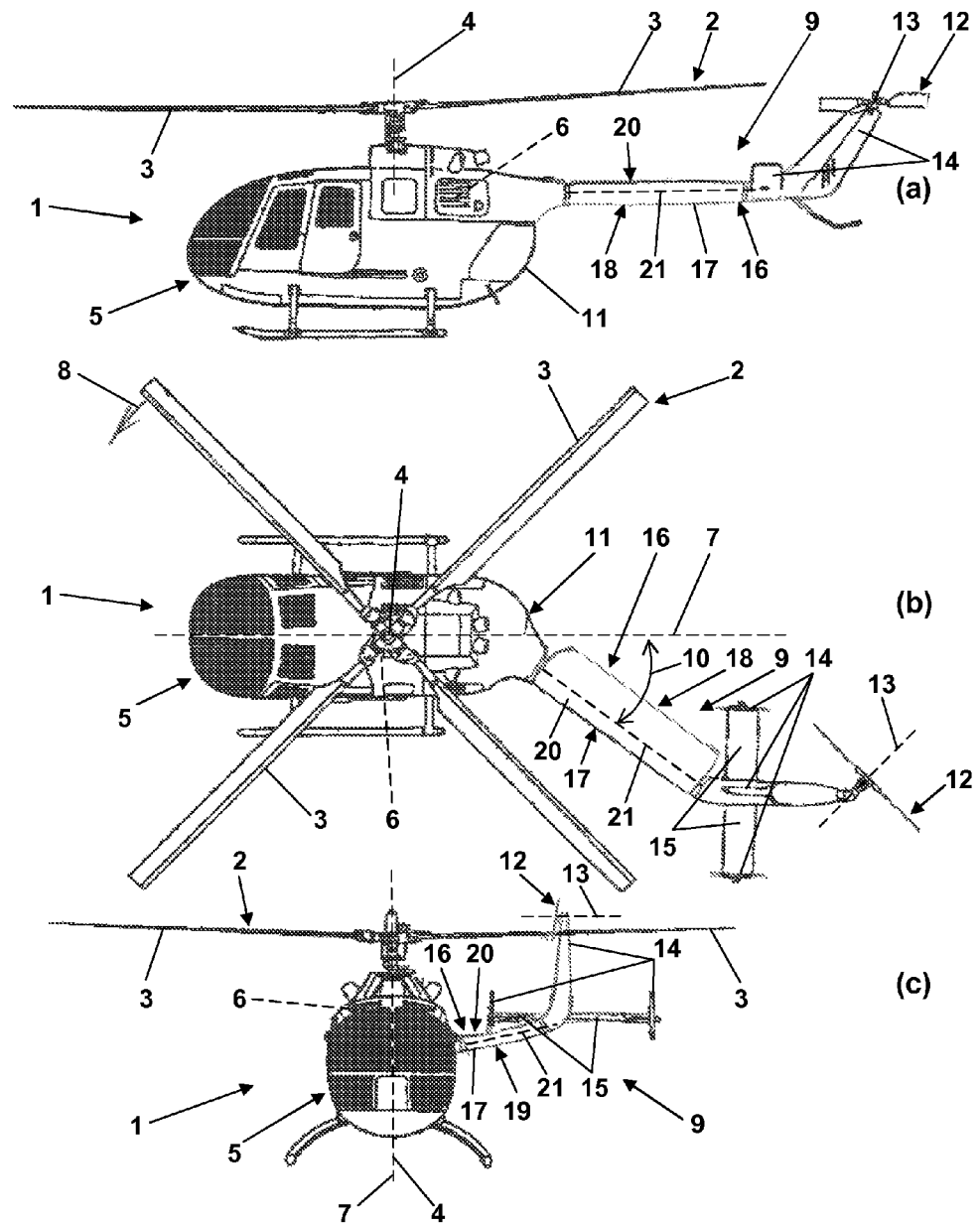
FIG. 2 shows the first embodiment of the helicopter according to FIG. 1 in a side view (a), a top view (b), and a front view (c) during forward flight.

During forward flight of the helicopter 1 as depicted in FIG. 2, the profiled body 9 is swiveled into a position with low inclination angle with regard to the horizontal flow and with its trailing edge arranged at its back, i.e. behind its leading edge 17. Thus, the profiled body generates lift on the retreating blade side of the horizontal rotor 2. At this retreating blade side, there is typically a lack of lift in forward flight of the helicopter 1, because the flow velocity of the flow against the rotor blades 3 is reduced by the backward movement of the rotor blades 3 as compared to the forward velocity of the helicopter 1. In common helicopters, this lack of lift is compensated for by a higher pitch angle of the rotor blades 3 at the retreating blade side of the horizontal rotor 2. With higher flight velocities, however, this compensation becomes difficult as the pitch angle may only be increased within limits set by the danger of flow separation. The counter torque to the torque of the horizontal rotor 2 in forward flight will be partially provided by a flow resistance or drag of the boom 9 on the retreating blade side of the horizontal rotor 2. The remainder of the required counter torque may be generated by the fin 14 whose pitch angle may be adjustable to vary the counter torque as suitable. The vertical rotor 2 may then even generate additional thrust for the helicopter 1 in that its thrust direction is reversed by reversing the pitch angle of its rotor blades with regard to their adjustment during hovering flight of the helicopter 1 according to FIG. 1.

When the rotor drive 6 breaks down, the helicopter 1 drops. As a result the horizontal rotor 2 is subject to an airflow by which it is excited for autorotation so that the horizontal rotor generates lift. In this case, the flight direction of the helicopter 1 is stabilized by the boom 9, particularly by its fin 14 and also by its stab 15 at the free end of the boom 9. However, this stabilization does not stabilize the helicopter 1 in a direction running in the longitudinal middle plane 7 but in a direction somewhere between the longitudinal middle plane 7 and the main axis 21 of the boom 9. In this direction, the forward flight of the helicopter 1 may also be started with working rotor drive 6.

Figure 3:
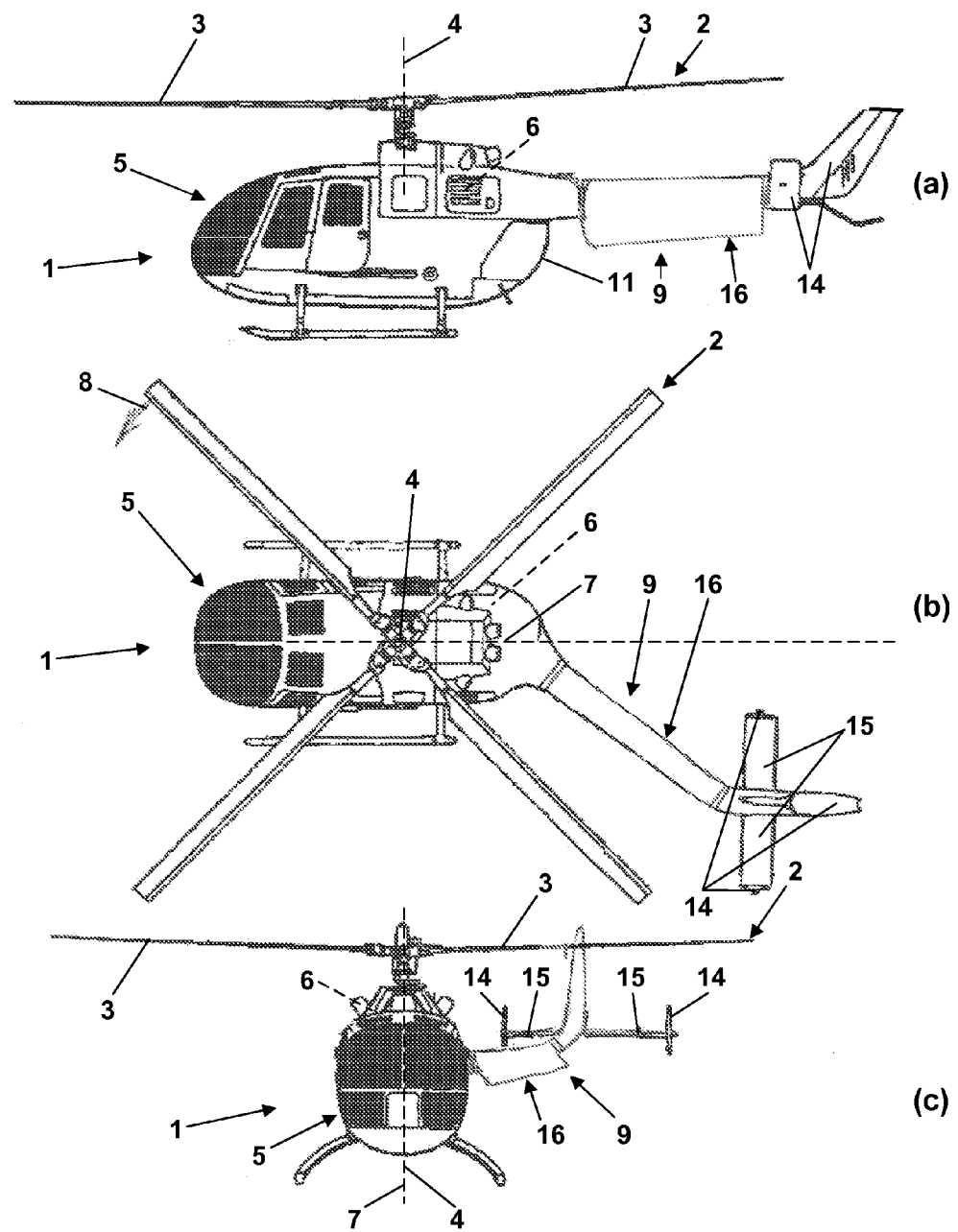
FIG. 3 shows a second embodiment of the helicopter according to the present invention in a side view (a), a top view (b), and a front view (c) during hovering flight.

The helicopter 1 illustrated in FIG. 3 is a variant of the helicopter 1 according to FIGS. 1 and 2 but has no vertical rotor at its boom 9. In FIG. 3, the helicopter 1 is depicted in hovering flight during which the counter torque to the torque of the horizontal rotor 2 is generated with the profiled body 16 in that it deflects the downwardly directed airflow generated with the horizontal rotor 2. When the counter torque to the torque of the horizontal rotor 2 of the helicopter 1 is only generated and adjusted by means of the profiled body 16 of the boom 9, however, no independent adjustment of the lift of the profiled body 16 on the retreating blade side of the horizontal rotor 2 is possible during forward flight of the helicopter 1.

Many variations and modifications may be made to the preferred embodiments of the invention without departing substantially from the spirit and principles of the invention. All such modifications and variations are intended to be included herein within the scope of the present invention, as defined by the following claims.

We claim:

1. A helicopter, comprising:
   a vertical longitudinal middle plane;
   only a single horizontal rotor including rotor blades:
   a rotor drive driving the horizontal rotor for rotation about a vertical rotor axis, the horizontal rotor having a advancing blade side on which the rotor blades run in forward direction and a retreating blade side on which the rotor blades run in backward direction in forward flight of the helicopter, the advancing blade side and the retreating blade side of the horizontal rotor meeting at the vertical longitudinal middle plane; and
   a boom extending backwards from the vertical rotor axis at a fixed angle selected from a range from about 20° to about 60° to the vertical longitudinal middle plane of the helicopter on the retreating blade side of the horizontal rotor;
   wherein the boom comprises a profiled body, the profiled body including a leading edge, a trailing edge and aerodynamic effective surfaces extending between the leading edge and the trailing edge, the profiled body being configured to selectively generate lift on the retreating blade side of the horizontal rotor in forward flight of the helicopter; and
   wherein the profiled body is swivel mounted such that at least a part of the profiled body can be swiveled about a swivel axis running parallelly to the main axis of the boom for reducing a cross-sectional area of the profiled body facing the horizontal rotor during hovering flight of the helicopter as compared to forward flight of the helicopter.

2. The helicopter of claim 1, wherein the profiled body is swivel mounted such that the profiled body can be swiveled about the swivel axis to such an extent that its trailing edge is positioned in front of its leading edge.

3. The helicopter of claim 1, wherein the profiled body is actively swiveled.

4. The helicopter of claim 1, wherein the profiled body is passively swiveled against a stop in forward flight of the helicopter.

5. The helicopter of claim 1, wherein the boom includes a vertical rotor, the vertical rotor having a horizontal rotor axis aligned tangentially to a circumference around the vertical rotor axis of the horizontal rotor.

6. The helicopter of claim 5, wherein the vertical rotor is configured to reverse its thrust direction along its horizontal rotor axis.

7. The helicopter of claim 5, wherein the vertical rotor is shrouded.

8. The helicopter of claim 1, wherein an adjustable fin is provided at the boom.

9. The helicopter of claim 1, wherein the profiled body is rigid and provides essentially all aerodynamic effective surfaces of the boom over its extension along the main axis of the boom.

10. The helicopter of claim 1, wherein the profiled body encloses a supporting structure of the boom over its extension along the main axis of the tail.

* * * * *